United States Patent
Dams

[19]

[11] Patent Number: 6,025,561
[45] Date of Patent: *Feb. 15, 2000

[54] CLAMPING MEMBER

[75] Inventor: Francis Dams, Edegem, Belgium

[73] Assignee: N.V. Raychem S.A., Kessel-Lo, Belgium

[*] Notice: This patent issued on a continued prosecution application filed under 37 CFR 1.53(d), and is subject to the twenty year patent term provisions of 35 U.S.C. 154(a)(2).

[21] Appl. No.: 08/983,096

[22] PCT Filed: Jul. 12, 1996

[86] PCT No.: PCT/GB96/01652

§ 371 Date: Mar. 2, 1996

§ 102(e) Date: Mar. 2, 1996

[87] PCT Pub. No.: WO97/04345

PCT Pub. Date: Feb. 6, 1997

[30] Foreign Application Priority Data

Jul. 19, 1995 [GB] United Kingdom .................. 9514769

[51] Int. Cl.⁷ ................................................. H02G 15/08
[52] U.S. Cl. ............................................... 174/91; 174/93
[58] Field of Search ................................. 174/87, 89, 91, 174/92, 93

[56] References Cited

U.S. PATENT DOCUMENTS

| | | | |
|---|---|---|---|
| 3,044,037 | 7/1962 | Honig | 174/91 X |
| 3,124,405 | 3/1964 | Massa | 174/91 X |
| 4,736,072 | 4/1988 | Hvidsten | 174/91 X |
| 4,810,829 | 3/1989 | Rutenbeck et al. | 174/91 X |
| 4,902,856 | 2/1990 | Miller | 174/91 |
| 5,059,748 | 10/1991 | Allen et al. | 174/87 |
| 5,446,241 | 8/1995 | Mackaness et al. | 174/91 |

FOREIGN PATENT DOCUMENTS

| | | | |
|---|---|---|---|
| 94/14095 | 6/1994 | WIPO | G02B 6/44 |
| 95/06892 | 3/1995 | WIPO | H02G 15/18 |

*Primary Examiner*—Kristine Kincaid
*Assistant Examiner*—Chau N. Nguyen
*Attorney, Agent, or Firm*—Herbert G. Burkard

[57] ABSTRACT

A casing, e.g. for a cable splice closure, includes: (a) first and second parts, each of which has a peripheral flange, and (b) a clamping member in the form of a split ring which, in use, is placed around the flanges of the first and second parts and thereby clamps the parts together, at least part of the clamping member being formed as a single flexible piece which may be flexed open to allow the clamping member to be placed around the flanges of the first and second parts.

16 Claims, 3 Drawing Sheets

CLAMPING MEMBER

FIELD OF THE INVENTION

The present invention relates to a casing which includes a clamping member for clamping together two parts of the casing, particularly a casing of a cable splice closure, e.g. for enclosing telecommunications cables, especially optical fibre cables, or other cables. The invention also relates to a clamping member for clamping together two parts of a casing, e.g. to close the casing around a cable splice.

BACKGROUND OF THE INVENTION

Cable splice closures in which two parts of the casing are clamped together by means of a clamping member in the form of a split ring are known. For example, U.S. Pat. No. 5,059,748 discloses a re-enterable butt cable splice closure comprising a base and a domed cover. The base and the cover each have a circumferential flange, and when the casing is closed the two flanges are brought together and a clamping member in the form of a hinged split ring is placed around the flanges and thereby clamps the base and the cover together. The clamping member comprises two semi-circular parts which are hinged together so that the member can be opened out to be placed around the flanges, and a screw threaded fastening device which fastens the hinged semi-circular parts together once the clamping member has been installed around the flanges.

International Patent Application No. WO 94/14095 (Raynet Corporation) discloses a pressure clamp for a telecommunications closure, which clamps mating parts of the closure together so as to form a watertight seal. The pressure clamp is in the form of a hinged split ring which may be hinged opened and placed around the mating surfaces of the closure parts. The clamp includes an over-centre latch which is rotatable between a first unlatched position and a second latched position, a clamping pressure generated by the latch increasing to a maximum value as the rotatable latch is moved from its first position to an intermediate position and then decreasing from this maximum value as the latch is moved from the intermediate position to the second position. A predetermined appropriate clamping pressure is generated when the latch is in its second (latched) position, so as to compress an O-ring disposed between the mating parts of the closure by an appropriate amount.

Although such clamping members work very well, they are often an expensive part of the casing due to the fact that they are formed from three or more separate parts which have to be assembled together (the three parts being, for example, the two hinged semi-circular major parts of the clamp, and the fastening device or over-centre latch). While closing a casing by means of a conventional split ring clamping member is a simple system, the clamping member itself is comparatively elaborate. Also, it can often be difficult to close the clamping member around the flanges, since, of necessity, the clamping member is a tight fit, and consequently the installation engineer often needs to use a tool to provide leverage to force the hinged parts sufficiently close together before the fastening device or over-centre latch can be used to fasten them together. Furthermore, opening the clamping member after it has been installed, in order to gain entry to the interior of the casing, can also often be difficult, requiring the use of tools to lever the hinged parts of the clamping member apart.

SUMMARY OF THE INVENTION

An object of the invention is to provide a clamping member, and a casing including such a clamping member, which overcomes the above drawbacks, i.e. which is simpler and less costly to manufacture, and which is easier to install and remove, than conventional split ring clamping members, but which is just as effective and reliable.

According to a first aspect of the invention, there is provided a clamping member for clamping together two parts, comprising a split ring having at least two axially spaced apart projections on the inside surface thereof for receiving between them peripheral flanges on the parts and thereby clamping the parts against axial movement away from each other, wherein at least part of the clamping member is formed as a single flexible piece which may be flexed open to allow the clamping member to be placed around the parts.

According to a second aspect of the invention there is provided a casing, comprising:
 (a) first and second parts, each of which has a peripheral flange; and
 (b) a clamping member in the form of a split ring which, in use, is placed around the flanges of the first and second parts and thereby clamps the parts together;
wherein at least part of the clamping member is formed as a single flexible piece which may be flexed open to allow the clamping member to be placed around the flanges of the first and second parts.

The flanges of the first and second parts preferably extend around substantially the entire periphery of their respective part (e.g. if the parts are circular in cross-section, the flanges preferably extend around substantially the entire circumference of their respective part). In the broadest aspect of the invention, however, each flange may comprise one or more discrete projections on the periphery of its respective part, i.e. the flanges need not necessarily extend around the parts. Clamping the first and second parts of the casing together preferably closes the casing, or at least part of the casing. The casing preferably comprises a cable splice closure casing or other cable accessory casing, or a duct or feedthrough for example.

The invention has the advantage that because at least part of the clamping member is formed as a single flexible piece it is normally simpler in construction, and consequently less costly to manufacture, than split ring clamping members which are hinged in order to allow them to be opened out. It also has the advantage that because the clamping member is flexible and may be flexed open to allow it to be placed around the flanges of the first and second parts, it is normally easier to install around, and subsequently to remove from, the flanges than conventional split ring clamping members.

By the term "split ring" is meant that the clamping member is closed in cross-section except for a split which enables it to be opened out and placed around the flanges of the first and second parts. The split may be very large, e.g. forming, say, a third or a quarter of the periphery or circumference of the clamping member, but preferably it is much smaller than this, e.g. comprising a crack, slit, or other narrow gap in the clamping member. Although the clamping member is described as a split ring, in its broadest aspects it is not limited to circular, oval or other curved shapes (although these shapes are preferred, especially since cable splice closure casings are often, though not always, curved in cross-section): the clamping member may, for example, be angular, e.g. polygonal, in shape.

By the term "axially" is meant generally in the same direction as the direction in which the axis of the split ring of the clamping member extends. For clamping members which have no axis as such, and indeed for clamping members which do have an axis, this direction is generally substantially perpendicular to the plane of the split ring.

The clamping member preferably has at least two axially spaced apart projections on the inside surface thereof, between which, in use, are received the flanges of the first and second parts, thereby clamping the parts against axial movement away from each other. There may or may not be one or more sealing members or sealing materials between the flanges of the first and second parts. The axially spaced apart projections preferably define at least one groove which extends around the inside surface of the clamping member which, in use, receive(s) the flanges of the first and second parts and which consequently clamp(s) the parts together. The axially spaced apart projections on the inside surface of the clamping member thus preferably comprise flanges or ridges which, more preferably extend around substantially the entire inside surface of the clamping member.

It was mentioned above that at least part of the clamping member is formed as a single flexible piece. For embodiments in which only part of the clamping member is formed as a single flexible piece, this part preferably extends around substantially the entire clamping member. It is most preferred, however, that substantially the entire clamping member is formed as a single flexible piece. This has the advantage of simplicity, and the clamping member is consequently normally easy and inexpensive to manufacture. The clamping member may be formed from two or more pieces which are joined together such that the finished clamping member comprises a single piece. Preferably, however, the clamping member is formed in one piece, preferably from a single piece of material. The clamping member may, for example, be moulded, preferably as a single piece. Because the clamping member has a split and is flexible, it may advantageously be moulded without having to use mould slides to enable it to be removed from the mould, thus further reducing its manufacturing cost.

Preferably the clamping member is resiliently flexible. This has the advantage that it may normally form a snap-fit around the flanges of the first and second parts, and preferably it is held in place by its own resilience. However, whether or not the clamping member is resilient, it preferably has a securement means to secure it in place around the flanges of the first and second parts. The securement means may be integral with the clamping member or it may be one or more separate items. For example, it may comprise a catch or the like to hold each side of the split together, or it may comprise a tie wrap or the like placed around the clamping member to prevent it opening out accidentally. Such securement means are preferably simple and inexpensive, and will not normally add significantly to the complexity or cost of the clamping member.

In order to clamp the first and second parts together, the clamping member is preferably placed around the flanges sequentially. For example, the clamping member may be placed around the flanges by pushing it sequentially over the flanges. This is in contrast to conventional split-ring clamping members which are placed around both flanges at the same time.

Accordingly, a third aspect of the invention provides a method of clamping together first and second parts of a casing, the casing comprising a casing according to the second aspect of the invention, the method comprising placing the clamping member around the flanges sequentially.

The clamping member may advantageously be pre-installed around one of the flanges, and in use may subsequently additionally be placed around the other flange to clamp the first and second parts together. For this purpose, the clamping member may advantageously have a groove or the like in which the flange around which the clamping member is pre-installed sits, or the part of the casing on which the clamping member is pre-installed may have an additional flange against which the clamping member sits, thereby securing the pre-installed clamping member in place around the flange prior to clamping the first and second parts together. It is particularly preferred that, in use, the first and second parts are clamped together by bringing their flanges together, thereby causing the clamping member to be pushed over the other flange. When used in this way, the clamping member according to the invention provides a particularly easy way of clamping together the first and second parts. One advantage is that, because the clamping member is pre-installed around one of the flanges, it may facilitate in correctly aligning the two parts and mantaining this correct alignment as they are brought together, i.e. the clamping member may act as an aligning, positioning and/or guiding means for the parts. This is particularly useful in some casings in which a sealing member, e.g. an O-ring, is located between the first and second parts, since conventionally with such casings it has often been difficult for the installation engineer to position the first and second parts and the O-ring correctly and to maintain this correct positioning while forcing the first and second parts together (which normally entails compressing the O-ring between the first and second parts at the same time). This is explained and described in greater detail below, with reference to the drawings.

As already mentioned, the clamping member is preferably installed either by pushing it sequentially over the flanges or it is pre-installed around one of the flanges and then the flanges of the first and second parts are brought together thereby causing the clamping member to be pushed over the other flange. These methods of installation have the advantage that they are easy to carry out, and they also have the advantage that they avoid the necessity of making the clamping member sufficiently flexible that it can be opened out completely in order to be wrapped around the casing in a similar manner to conventional hinged clamping members. If either of these preferred installation methods is used, it is only necessary to make the clamping member flexible enough to enable the whole clamping member to increase in diameter by an amount equal to the height that the flanges protrude from the wall of the casing, rather than having to make it flexible enough to enable the split to be widened sufficiently for it to accommodate the full width of the casing as the clamping member is wrapped around the casing. Accordingly, in some preferred embodiments of the invention, the clamping member is only sufficiently flexible to enable it to be pushed over the flanges of the first and second parts.

Part of the clamping member and/or one or each peripheral flange of the casing preferably has a tapered surface which assists the clamping member to flex open as it is pushed over the flange(s) in use. It is particularly preferred that the clamping member and one or each peripheral flange each have such a tapered surface, the tapered surfaces cooperating with each other to assist in flexing the clamping member open as it is pushed over the flanges in use.

The first and second parts are preferably substantially circular or oval in cross-section, more preferably at least one of the parts being tubular. The parts are preferably brought together axially to clamp them together in use, each peripheral flange preferably being circumferential. It is particularly preferred that a portion of one of the parts overlaps a portion of the other part when they are clamped together in use. Preferably a sealing member seals between the overlapping portions of the first and second parts in use. For example, one part may slide over a peripheral surface of the other part, a sealing member, e.g. an O-ring, preferably sealing between this peripheral surface and the overlapping internal surface of the other part. Advantageously, sliding one part of the casing over the other part may cause the sealing member (e.g. an O-ring) to roll between the two parts, for example to roll from an initial position to a final sealing position. For example, prior to sliding one part over the other part, the sealing member may be seated on the peripheral surface of the part of the casing which is to be overlapped, adjacent to the edge of that part, and sliding the other part over that part may roll the sealing member along the peripheral surface of the overlapped part into a final sealing position. It is particularly preferred that the outer peripheral surface of the part which is overlapped is tapered or stepped so that as the sealing member is rolled towards its final sealing position it becomes increasingly compressed.

Advantageously, the sealing member is compressed, preferably in a radial direction, between the overlapping portions of the first and second parts of the casing. This has the advantage that the clamping member generally clamps the first and second parts together merely against axial separation from each other (e.g. by preventing them from sliding off each other) rather than directly against the resilience of a sealing member (e.g. an O-ring) which is compressed between them (as is the case with the pressure clamp disclosed in WO 94/14095). This is advantageous because it generally avoids having to make the clamping member, and its clamping action around the peripheral flanges, sufficiently strong to withstand the forces exerted by a compressed sealing member which arise due to its resilience (as is the case with the pressure clamp of WO 94/14095), and therefore normally enables the clamping member to be made more cheaply.

The invention will now be described, by way of example, with reference to the accompanying drawings, of which:

DETAILED DESCRIPTION OF THE PREFERRED EMBODIMENTS

Figure 1:
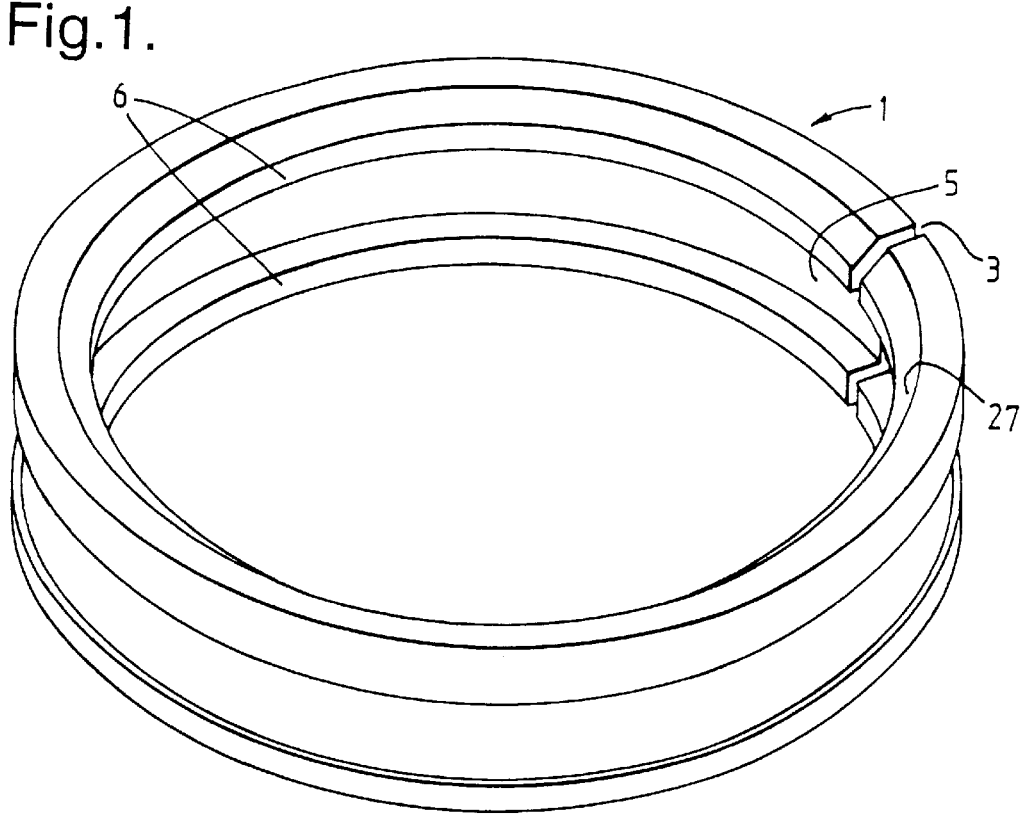
FIG. 1 shows, in perspective, a clamping member according to the invention.
Figure 2:
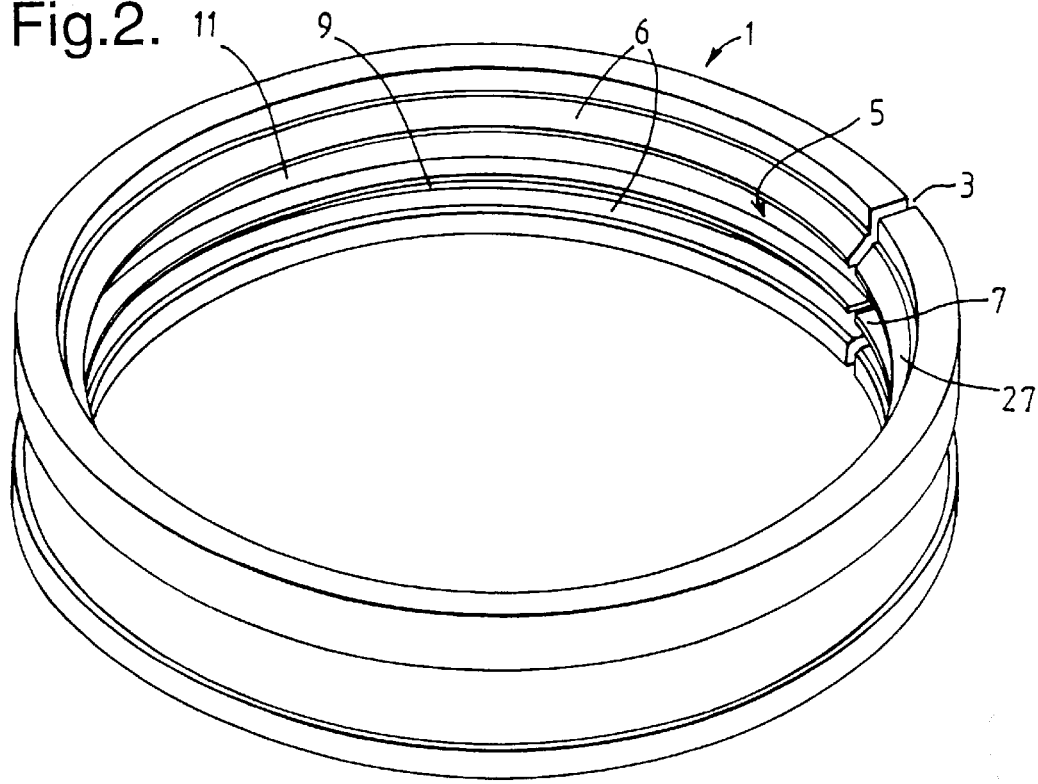
FIG. 2 shows, in perspective, another clamping member according to the invention.

FIGS. 1 and 2 each show a clamping member 1 according to the invention, comprising a split ring formed as a single piece. The clamping members 1 preferably comprise a plastics material, e.g. polypropylene, but they may comprise metal, for example. Each has a split 3, to enable it to be placed around the flanges of first and second parts of a casing or other article, to clamp the parts together. Each clamping member 1 has a groove 5 in its radially-internal circumferential surface (i.e. its inside surface) which is defined by two axially spaced apart projections 6 in the form of flanges or ridges, and in which, in use, are received the peripheral flanges of the first and second parts. In this way, the clamping member clamps the first and second parts together. The clamping member 1 shown in FIG. 2, has a circumferential ridge 7 which divides the groove 5 axially in two, each part of the groove 5 being adapted to receive one of the flanges. The lower part 9 of the groove 5 (as drawn) is for receiving the flange of one part of the casing on which the clamping member is pre-installed in use. The upper part 11 of the groove is for receiving the flange of the other part of the casing.

Figure 3A:
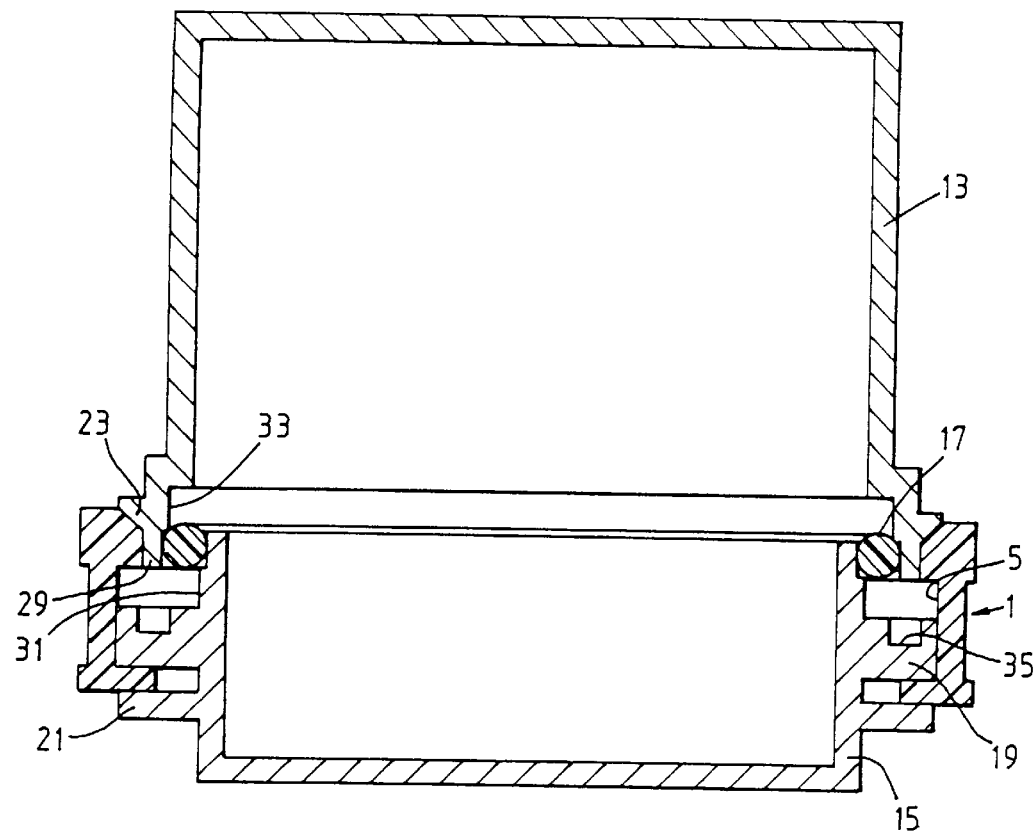
FIGS. 3a & 3b show, in cross-section, a casing according to the invention, including the clamping member of FIG. 1.
Figure 3B:
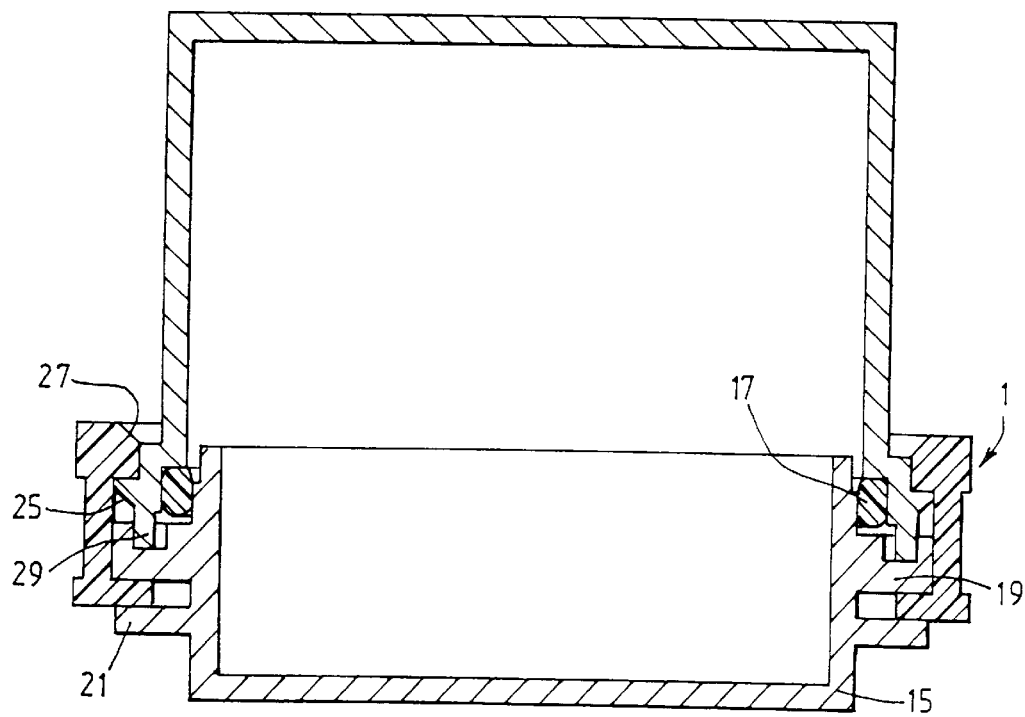

FIGS. 3a and 3b show, in cross-section, a cable splice closure casing according to the invention, comprising a cover or first part 13, a base or second part 15, the clamping member 1 shown in FIG. 1, and an O-ring sealing member 17. The casing is for enclosing a butt splice, the cables extending, in use, into the casing through the base 15. No cable entry openings (which would normally be present) are shown FIG. 3a shows the casing before the first part 13 and the second part 15 have been clamped together. The clamping member 1 has been pre-installed on the second part 15, with the clamping member being placed around the peripheral flange 19 of the second part. In order to hold the clamping member 1 in the correct axial position with respect to the second part 15 so that the first and second parts can be clamped together simply by bringing their flanges together, the second part has a second peripheral flange 21 behind the first peripheral flange 19. The clamping member 1 is thus trapped between the flanges 19 and 21 and consequently held in place. The peripheral flange 23 of the first part, and the clamping member 1, each have a tapered surface, indicated 25 and 27 respectively, which, in FIG. 3a are abutting each other, and a forward section 29 of the first part 13 is shown extending between part of the clamping member 1 and the O-ring sealing member 17 which is located around a peripheral surface 31 of the second part 15. In this way, the first part 13 is seated in the correct position for being clamped together with the second part 15.

FIG. 3b shows the casing after the first and second parts have been clamped together. This has been achieved by simply moving the first and second parts towards each other, which has caused the resiliently flexible clamping member to flex open, assisted by the cooperating tapered surfaces 25 and 27, allowing the peripheral flange 23 of the first part 13 to be received by the clamping member. Thus snap-in is allowed, but snap-out is resisted. During this movement of the first part 13 with respect to the second part 15 and the clamping member 1, the O-ring sealing member 17 has been rolled between the peripheral surface 31 of the second part and the overlapping internal surface 33 of the first part, and has formed a seal between these two surfaces. The forward section 29 of the first part 13 has been located in a receiving groove 35 in the peripheral flange 19 of the second part The movement of the first part 13 into the clamped engagement with the second part 15 has been guided by the clamping member 1, thereby assisting the installation engineer.

Figure 4A:
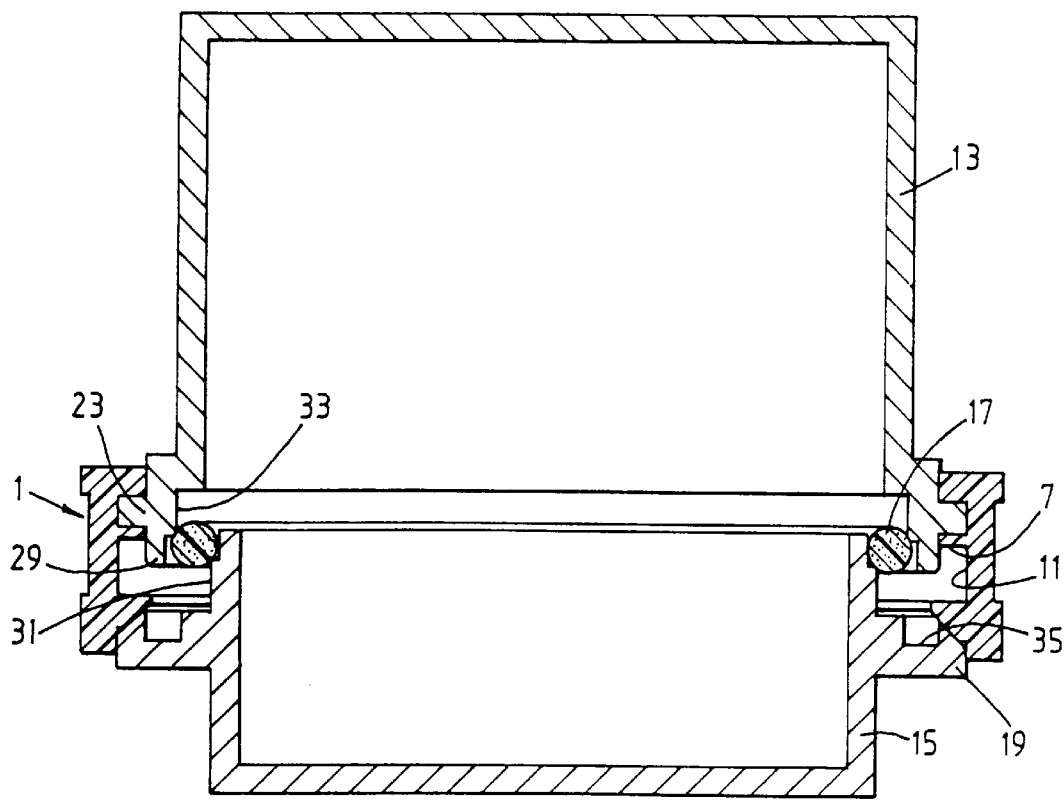
FIGS. 4a & 4b show, in cross-section, another casing according to the invention, including the clamping member of FIG. 2.
Figure 4B:
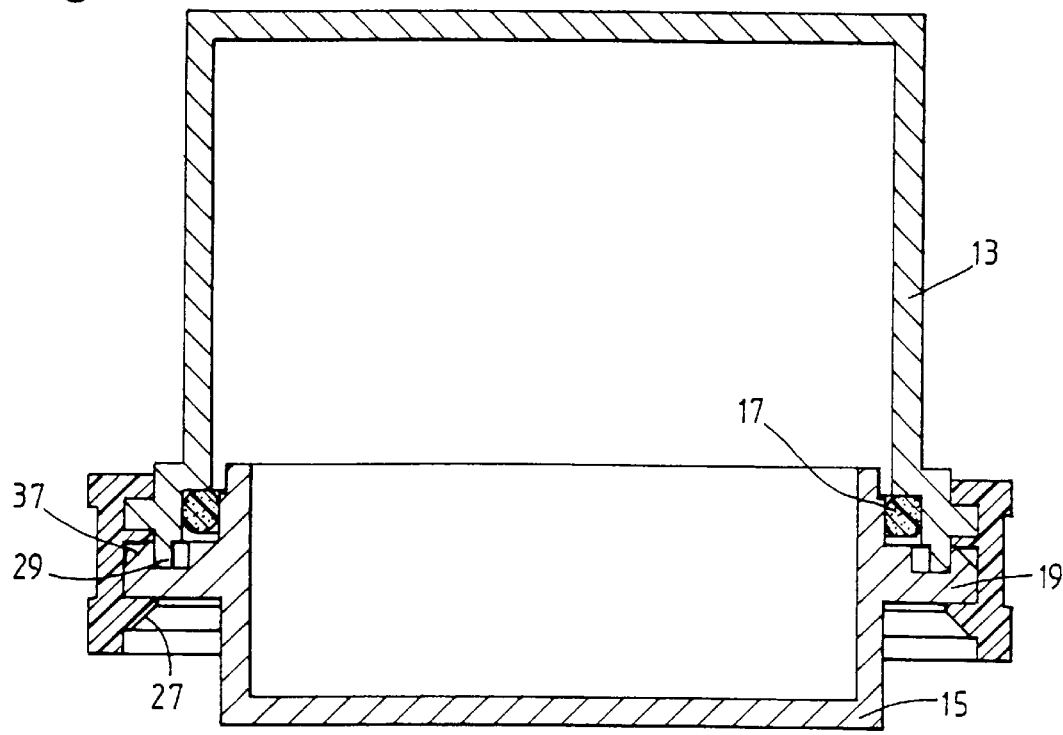

FIGS. 4a and 4b illustrate the same clamping operation carried out using a different casing. Equivalent components are given the same reference numerals as those in FIGS. 3a and 3b.

The difference between the casing of FIGS. 4a and 4b and the casing of FIGS. 3a and 3b, is that, whereas in the latter the clamping member was pre-installed on the base or second part 15, in the former the clamping member is pre-installed on the cover or first part 13. The clamping member shown in FIGS. 4a and 4b is that shown in FIG. 2. The flange 23 is pre-installed in the part 9 of the groove 5 of the clamping member, and the clamping member is therefore held in the correct axial position with respect to the first part 13 for receiving the second part 15, by the circumferential ridge 7. The clamping member has a tapered surface 27, similarly to that shown in FIGS. 3a and 3b, but it is the peripheral flange 19 of the second part 15 which has a cooperating tapering surface 37, rather than the flange 23 of the first part 13.

I claim:

1. A casing, comprising:
   (a) first and second parts, each of which has a circumferential peripheral flange; and
   (b) a clamping member formed as a single resiliently flexible piece in the form of a split ring having a gap to allow the split ring to expand and flex open which, in use, is placed around the flanges of the first and second parts in a snap fit and thereby clamps the parts together; wherein the clamping member includes at least two axially spaced apart projections on the inside surface thereof to define at least one groove which extends around the inside surface of the clamping member, between which, in use, are received the flanges of the first and second parts, thereby clamping the parts against axial movement away from each other, wherein said clamping member includes an outer surface having an outwardly tapered surface, allowing said clamping member to be sequentially placed over each of said first and second parts by engaging said outwardly tapered surface with said first and second parts and pushing thereon to expand the split ring to allow the split ring to pass over the first part and onto the second part and into a snap fit over said first and second parts such that a portion of one part overlaps the other part.

2. A casing according to claim 1 wherein in order to clamp the first and second parts together in use, the clamping member is placed around the flanges sequentially.

3. A casing according to claim 1 wherein the clamping member is pre-installed around one of the flanges, and in use is additionally placed around the other flange to clamp the first and second parts together.

4. A casing according to claim 1, wherein the first and second parts are substantially circular or oval in cross-sections, wherein at least one of the parts is tubular, wherein the parts are brought together axially to clamp them together in use.

5. A casing according to claim 1, further comprising a sealing member which, in use, seals between the overlapping portions of the first and second parts.

6. A casing according to claim 5, in which, in use, a portion of one of the parts is slid over a peripheral surface of a portion of the other part, causing the sealing member to be rolled between the first and second parts along said peripheral surface, from an initial position to a final sealing position.

7. A casing according to claim 6, in which said peripheral surface and an internal surface of the part which is slid over said peripheral surface, is tapered and has a step, which, in use, causes the sealing member to become increasingly compressed as it is rolled towards said final sealing position.

8. A casing according to claim 1, in which, in use, the clamping member clamps the first and second parts together by preventing them from sliding off each other.

9. A casing according to claim 1 which is a cable splice closure casing.

10. A clamping member for clamping together two parts having circumferential peripheral flanges thereon and wherein a portion of one part overlaps a portion of the other part, comprising a split ring having a gap to allow expansion and the ring to flex open and having at least two axially spaced apart projections on the inside surface thereof to define at least one groove which extends around the inside surface of the clamping member for receiving between them peripheral flanges on the two parts and thereby clamping the two parts against axial movement away from each other, wherein the clamping member is formed as a single flexible piece to be flexed open to allow the clamping member to be placed around the two parts, wherein the clamping member includes an outer surface having an outwardly tapered surface, allowing the clamping member to be sequentially placed over each of said first and second parts by engaging said outwardly tapered surface with said first and second parts and pushing thereon to expand the split ring to allow the split ring to pass over the first part and onto the second part and into a snap fit over said first and second parts.

11. A method of clamping together first and second parts of a casing, the casing comprising a respective circumferential peripheral flange on each of the first and second parts, a clamping member in the form of a split ring and at least part of which is formed as a single flexible piece, and having a gap forming the split to allow the ring to expand wherein the clamping member includes an outer surface having an outwardly tapered surface, and having at least two axially spaced apart projections on the inside surface thereof to define at least one groove which extends around the inside surface of the clamping member, the method comprising the steps of placing the clamping member around the flanges sequentially by engaging the outwardly tapered surface with the first and second parts and pushing forward on the split ring to expand the split ring to allow the split ring to pass over the said first part and onto the second part and into a snap fit over first and second parts such that a portion of one part overlaps a portion of the other part.

12. A method according to claim 11, in which the clamping member is pre-installed around one of the flanges, and the first and second parts are subsequently clamped together by bringing the flanges together, thereby causing the clamping member to be pushed over the other flange.

13. A method according to claim 12, the casing further comprising a sealing member to seal between the first and second parts, in which, when the flanges are brought together, a portion of one of the parts is slid over a peripheral surface of a portion of the other part, causing the sealing member to be rolled between the first and second parts along said peripheral surface from an initial position to a final sealing position.

14. A casing comprising:
   (a) first and second parts a portion of one of said parts overlapping the other and each of which has a circumferential peripheral flange; and
   (b) a clamping member formed as a single resiliently flexible piece in the form of a split ring having a gap to allow the split ring to expand and flex open which, in use, is placed around the flanges of the first and second parts in a snap fit and thereby clamp the parts together; wherein the clamping member includes at least two axially spaced apart projections on the inside surface thereof to define at least one groove which extends around the inside surface of the clamping member, between which, in use, are received the flanges of the first and second parts, thereby clamping the parts against axial movement away from each other, wherein said clamping member includes an outer surface having an outwardly tapered surface, allowing said clamping member to be positioned over the flange of at least one of the first and second parts by engaging said outwardly tapered surface with said flange and causing relative movement between said clamping member and said flange such that said split ring is expanded to allow it to pass over said flange and into a snap fit thereon, wherein the clamping member is pre-installed around one of the flanges, and in use is additionally placed around the other of the flanges to clamp the first and second parts together.

15. A clamping member for clamping together two parts having circumferential peripheral flanges thereon, comprising a split ring with opposing outer surfaces having a gap to allow expansion and the ring to flex open and having at least two axially spaced projections on the inside surface thereof to define at least one groove which extends around the inside surface of the clamping member for receiving between them peripheral flanges on the two parts and thereby clamping the two parts against axial movement away from each other, wherein the clamping member is formed as a single flexible piece to be flexed open to allow the clamping member to be placed around the two parts, wherein the clamping member includes an outwardly tapered surface on only one of said outer surfaces, wherein said other outer surface includes at least one circumferential substantially rectangular configured flange, wherein the clamping member can be placed over said flanges and into a snap fit over said two parts, and securement means for restraining opening of said gap of said split ring when located in position on said two parts.

16. A clamping member according to claim 15, wherein said outer surface includes a first circumferential flange and second circumferential flange spaced inward forming a groove.

* * * * *

UNITED STATES PATENT AND TRADEMARK OFFICE
CERTIFICATE OF CORRECTION

PATENT NO. : 6,025,561
DATED : February 15, 2000
INVENTOR(S) : Dams

It is certified that error appears in the above-indentified patent and that said Letters Patent is hereby corrected as shown below:

Column 5, Line 38 delete, "BRIEF DESCRIPTION OF THE DRAWINGS"
Column 5, Line 35 insert "BRIEF DESCRIPTION OF THE DRAWINGS"
Column 6, Line 49, insert "." before "The"
Claim 14, line 1, after "parts" insert ","
Claim 14, line 8, delete "in use"
Claim 14, line 13, delete "in use"
Claim 14, line 24, delete " in use"
Claim 15, line 8, before "peripheral" insert –said–.
Claim 16, line 2, delete "said outer surface" and replace with "said at least one circumferential substantially rectangular configured flange"
Claim 16, line 3, insert "a" before "second"
Claim 16, line 3, delete "forming a" and replace with "from said first circumferential flange to form another"

Signed and Sealed this

Twentieth Day of March, 2001

*Attest:*

NICHOLAS P. GODICI

*Attesting Officer*     *Acting Director of the United States Patent and Trademark Office*